April 9, 1963 R. C. LAMY 3,085,232

MAGNETIC STORAGE DEVICES

Filed Oct. 3, 1958 2 Sheets-Sheet 1

3,085,232
MAGNETIC STORAGE DEVICES
Richard C. Lamy, Poughkeepsie, N.Y., assignor to International Business Machines Corporation, New York, N.Y., a corporation of New York
Filed Oct. 3, 1958, Ser. No. 765,177
4 Claims. (Cl. 340—174)

Figure 1:
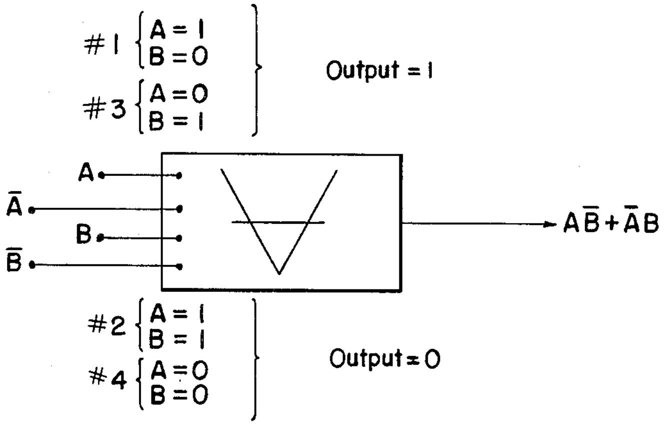

This invention relates to magnetic core storage devices and has for an object the provision of a magnetic storage system of the non-destructive read-out type forming an Exclusive-OR circuit.

The present invention takes advantage of features of my Patent 2,814,792, dated November 26, 1957, and in particular the manner in which bits of information may be stored by causing magnetic cores to assume different stable remanence conditions. As explained in said patent and in my application, Serial No. 531,950, filed Sept. 1, 1955, now Patent No. 2,996,664, and in respect to which the present application is a continuation-in-part, a sampling winding may be associated with the core so that the core may be repeatedly interrogated as to the stored information.

It is an object of this invention to provide a storage device of the non-destructive sampling type comprising at least two magnetic cores with windings thereon, each magnetic core being capable of assuming different stable remanence conditions.

Another object of this invention is to provide an Exclusive-OR magnetic storage device for storing information received on two inputs and by repeated interrogation or sampling determining if information appears on one or the other but not on both of the inputs.

A further object of this invention is to provide an Exclusive-OR storage device comprising two magnetic cores, each capable of assuming different stable remanence conditions, and non-destructively sampling the remanence conditions of the magnetic cores for producing an output indicative of a remanence condition of one core differing from the remanence condition of the other core.

The present invention is primarily concerned with what has come to be known as the "Exclusive-OR" circuit and one which will satisfy the following logic table:

| Step | Input A | Input B | Output C | |
|---|---|---|---|---|
| 1 | 1 | 0 | 1 | $=A\bar{B}+\bar{A}B$ |
| 2 | 1 | 1 | 0 | |
| 3 | 0 | 1 | 1 | |
| 4 | 0 | 0 | 0 | |

In carrying out the invention in one form thereof there are provided two magnetic cores, each capable of assuming two stable remanence conditions. Each core is provided with input, inhibit, and sampling windings. A reset means is associated with both cores for establishing in each a first stable remanence condition. Each input circuit includes an input winding magnetically associated with one core and one of the inhibit windings embracing the other core for selectively changing one of the two cores from a first stable remanence condition to a second stable remanence condition. There are provided series-connected output means coupled to the cores and respectively responsive to changes in flux levels in the cores for developing output pulses. By means of a sampling circuit, sampling pulses are applied to the sampling windings of magnitude insufficient to change the state of either core, but adequate to produce an output when the stable remanence conditions of the cores differ, and which does not produce an output when the conditions are of like character.

Figure 2:
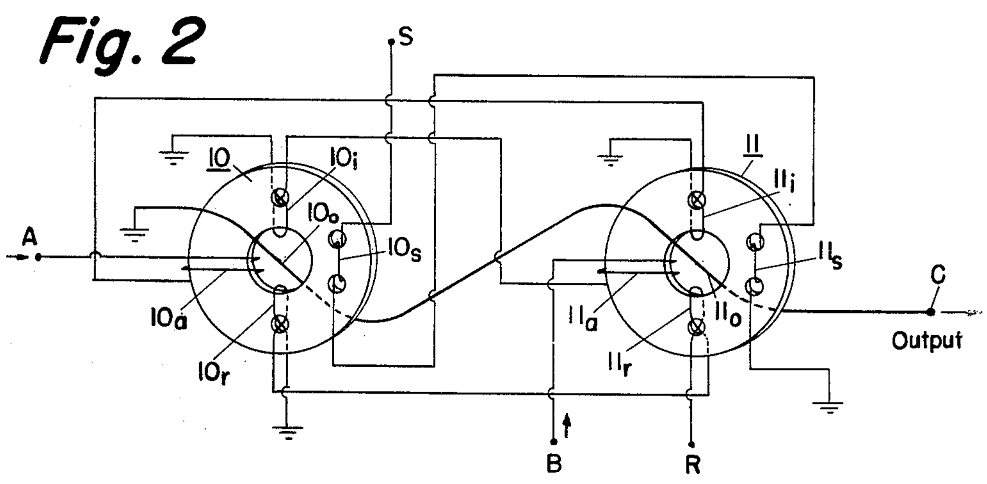

For a more complete understanding of the invention and for the manner in which it functions in detail to provide a solution for the logic box or table provided above, reference is to be had to the following description taken in conjunction with the accompanying drawings, in which:

FIG. 1 symbolically represents a typical Exclusive-OR circuit illustrating the four possible inputs together with the outputs for each input;

FIG. 2 diagrammatically illustrates an embodiment of the present invention; and

FIGS. 3–7B are diagrams explanatory of the operation of the invention.

Referring now to the above table taken in conjunction with FIG. 1, it will be observed that step No. 1 shows that A has a value of 1, with B at 0. For this condition the output is unity. With unity inputs for both A and B, the output is 0 as shown by step No. 2. For step No. 3, $A=0$, $B=1$, the output will be unity, and for step No. 4, A and B are both equal to 0, the output will be 0. The foregoing fulfills the requirements:

$$\text{Output}=A\bar{B}+\bar{A}B$$

The foregoing requirements are met by the circuit arrangement of FIG. 2 including the cores 10 and 11 forming closed magnetic circuits capable of assuming different stable remanence conditions, the cores being of endless or toroidal configuration. The first input circuit A has an input winding 10*a* wound about the core 10. The input circuit includes an inhibit winding 11*i* having the configuration of the figure 8 and extending through an opening in core 11. The lower bight embraces the inner section of the magnetic core, and the upper bight of winding 11*i* embraces the upper portion of the core. Similarly, a second input circuit B includes an input winding 11*a* and an inhibit winding 10*i* in series therewith and having the aforesaid shape extending through an opening in the core 10.

In order to establish in each of cores 10 and 11 the same stable remanence conditions, reset windings 10*r* and 11*r*, of figure 8 configuration, are disposed within openings in the cores. As shown, they are serially connected, but they may be connected in parallel in a reset circuit R. Each of the cores has an interrogating or sampling winding. They are preferably connected in series in a sampling circuit S. The sampling winding 10*s* of core 10 has its turns extending through a pair of openings with the axis of the winding generally radial of the core 10. The core 11 has a like structural arrangement for the sampling winding 11*s*. A series-connected output means coupled to the cores 10 and 11 includes the output circuit C and includes a single conductor extending through the main central openings of cores 10 and 11.

Figure 3:
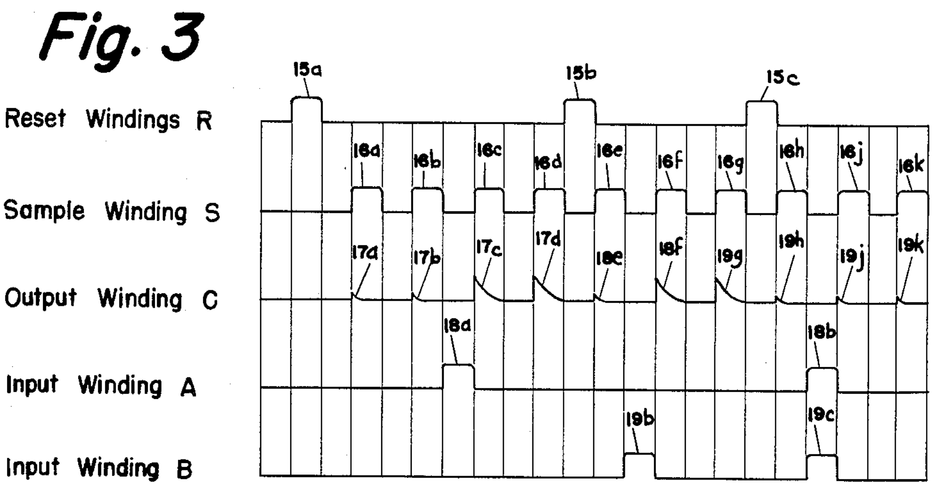

In operation, the cores 10 and 11 are first established in the same stable remanence condition as by applying to the reset windings 10*r* and 11*r* a pulse 15*a*, FIG. 3, of substantial amplitude. The polarity and amplitude of the pulse are adequate for the production on the cores 10 and 11 by the reset windings 10*r* and 11*r* of magnetizing forces of magnitude to cause each core to assume the same stable remanence condition, as for example, at the position indicated at $-B_r$, FIGS. 4A and 4B. If either core had a stable remanence condition, as at $+B_r$, FIG. 5A, then the reset pulse applied to that core would cause a flux change as shown by the hysteresis loop. The flux in the core would move downwardly along the left-hand portion of the hysteresis loop and to the lower left-hand apex. Upon disappearance of the reset pulse, the remanent flux would be at a level generally indicated at $-B_r$. If the sampling winding S be now pulsed, no output will appear at the output circuit C. The sampling pulse 16*a*, FIG. 3, has an effect on each core as illustrated in FIG. 5B, that is, each sampling winding 10*s* and 11*s* produces a magnetizing force effective generally radially of each core and which is effective to change the magnetic flux therein. There is an excursion along the lower broken-line portion of the hysteresis loop from $-B_r$ toward the lower apex with return thereof to $-B_r$. It is to be noted that the pulse 16*a* is of insufficient amplitude traversing sampling winding 10*s* to change the stable state of either core. The excursion as described produces a slight change in flux in the cores 10 and 11, which flux links output windings 10*o* and 11*o*, but the change is of a very low order and produces an output signal 17*a* of such a low order of amplitude that it may for all practical purposes be considered as zero output. If the sampling circuit S be again pulsed, as shown at 16*b*, there is for practical purposes zero output, as indicated at 17*b*. For each operation of sampling, the cores 10 and 11 remain in a stable remanence condition. Accordingly, there is achieved non-destructive read-out of information on the storage devices on cores 10 and 11.

Assuming now that there is applied to the input circuit A, FIG. 2, an input pulse 18*a*, FIG. 3, with zero input to input circuit B, it will be noted that with the next sampling impulse 16*c* there appears at the output winding C and output pulse 17*c* of substantial magnitude. This fulfills the condition that there shall be an output from the Exclusive-OR storage device when at the input $A=1$ and $B=0$.

Figure 5A:
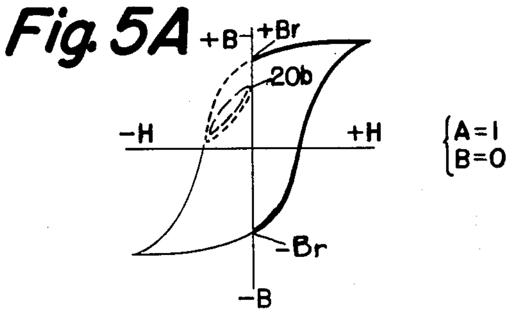

Upon the application of the pulse 18*a*, the input winding 10*a* is effective, FIG. 5A, to cause the flux in core 10 to follow the hysteresis loop upwardly from the point $-B_r$, and upon termination of pulse 18*a* to return to the point $+B_r$, all as indicated by the heavy black line forming the described portion of the hysteresis loop of FIG. 5A. At the same time, the pulse 18*a* traversing inhibit winding 11*i* causes the flux to traverse that portion of the hysteresis loop of FIG. 5B, shown by the heavy line, with return thereof at the termination of the pulse to the point 20*c*. This represents the same stable remanence condition as the initial state of core 11 at $-B_r$. Upon the application of the sampling pulse 16*c*, the flux of core 10, FIG. 5A, traverses that portion of the hysteresis loop shown by the heavy dots until a point is attained near the intersection of (1) the abscissa to the left of the origin and (2) the major hysteresis loop. With termination of sampling pulse 16*c*, the core returns to the position 20*b*, corresponding with a stable remanence condition for the core. It is a stable remanence condition since the appearance of a second sampling pulse 16*d* causes the flux in core 10 to change as indicated by the dash-line and with return to the point 20*b* upon termination of the pulse. The sampling pulse 16*c* drives the core 11 from point 20*c*, FIG. 5B, along the heavy dotted-portion, with return of the core to point 20*c*. The result of the foregoing is the development in the output circuit C of an output pulse 17*d* indicative of the storage in the Exclusive-OR device of "A$\overline{B}$." Upon application of a second sampling pulse 16*d*, the cores 10 and 11 traverse the dash-line loops of FIGS. 5A and 5B to yield an output as shown at 17*d*, FIG. 3. Such non-descructive read-out operations may be repeated as often as desired.

Figure 4A:
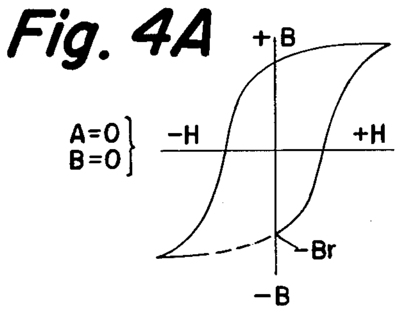
Figure 5B:
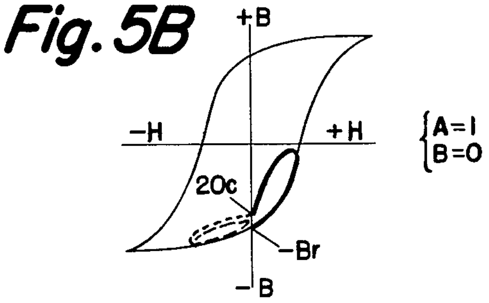
Figure 6A:
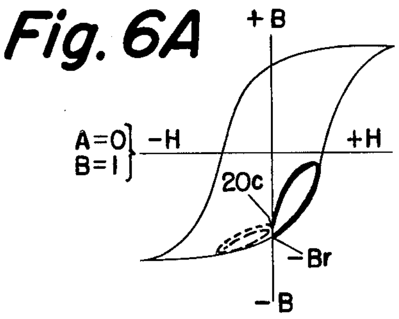

Assuming now that there is applied to the reset circuit R a second reset pulse 15*b*, such a reset pulse has no effect on core 11 except as shown in FIG. 4A. The condition $-B_r$ is established. However, for core 10, it returns that core to the stable remanence condition illustrated at $-B_r$. Accordingly, the sampling pulse 16*e* produces effectively a zero output 18*e* for the output circuit *c*.

Figure 6B:
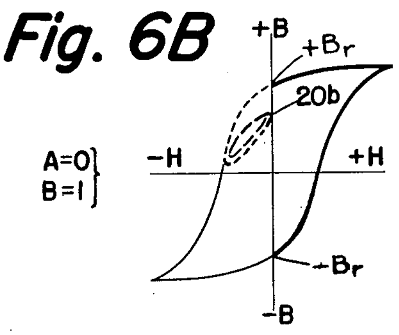

If there now be applied to input circuit B an input pulse 19*b*, with zero input to input circuit A, the input winding 11*a* will produce, FIG. 6B, a stable remanence condition as at the point $+B_r$. At the same time for core 10, that pulse will produce, FIG. 6A, an excursion from $-B_r$ along the heavy portion of the hysteresis loop with the core 10 returning to a stable remanence condition at 20*c* of the same character as it had initially. With the application of the next sampling pulse 16*f*, the flux changes in core 10 as illustrated by the dotted line, FIG. 6A, the flux condition ending with the stable remanence condition at 20*c*. For core 11, however, FIG. 6B, there is a large change of flux, as indicated by the dotted line, with the stable remanence condition 20*b* attained and with concurrent generation of an output pulse 18*f*. This corresponds with an output from the storage device corresponding with step No. 3, that is, with $\overline{A}$B. Upon the application of a further sampling pulse 16*g*, a second output pulse 19*g* is produced in the output circuit C, the excursions being shown by the dash-lines of FIGS. 6A and 6B.

Figure 7A:
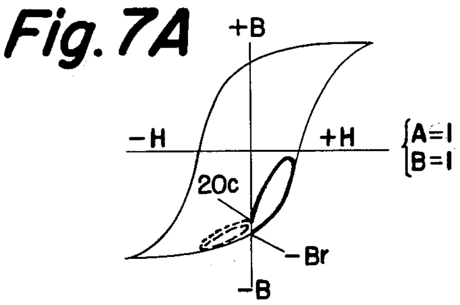
Figure 7B:
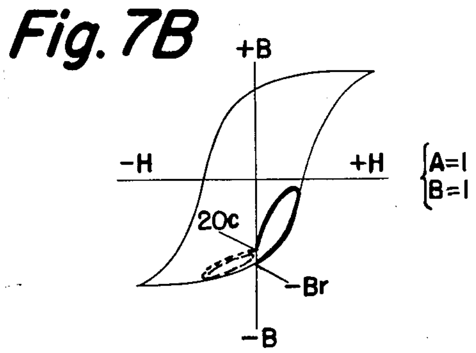

It will now be assumed that the reset circuit R is again pulsed as shown at 15*c* to return the cores 10 and 11 to the $-B_r$ conditions. Thereafter, there will be effectively zero output 19*h* upon application of sampling pulse 16*h*. There will now be applied in time-concurrence input pulses 18*b* and 19*c* to input circuits A and B. This complies with the step or condition No. 2, FIG. 1, of $A=1$ and $B=2$. It is required that there shall be zero output. Upon application of the sampling pulse 16*j*, there is effectively produced zero output 19*j* for the reason that the impulse 18*b* applied to input winding 10*a* prevents change in the remanence condition of core 11 through the action of inhibit winding 11*i*, while the pulse 19*c*, simultaneously applied to input winding 11*a*, prevents change in the magnetization of core 10 by reason of inhibit winding 10*i*. These inhibit windings in their figure 8 arrangement with each core are effective to prevent a change in the stable state of the core with which each is associated upon passage therethrough of a pulse, notwithstanding that there is an input pulse concurrently applied to an associated input winding. Thus, as shown in FIGS. 7A and 7B, stable remanence conditions 20*c* are maintained by each core. Both cores 10 and 11 upon application of the input pulses 18*b* and 19*c* follow the heavy portions of their hysteresis loops returning to stable remanence conditions at 20*c*. For the first sampling pulse, they traverse the dotted-line portion of the loop with a resultant zero output in the series output circuit. Upon appearance of a still further sampling pulse 16*k*, there is still substantially zero output 19*k*, the flux changes then taking place being illustrated by the dotted-line loop disposed to the left of, and in each case terminating at 20*c*.

Figure 4B:
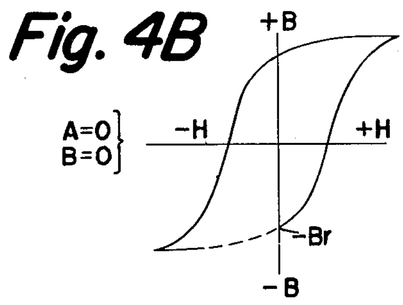

If it now be assumed that another reset pulse, such as pluse 15*a*, be applied, both cores 10 and 11 will be returned to their $-B_r$ positions and as shown in FIG. 4A and 4B. The effect of the first subsequent sampling pulse 16*a* produces zero output in the output winding, as described above and as illustrated in the aforesaid FIGS. 4A and 4B. Thus, there is indication that in the storage device the condition exists corresponding with $A=0$ and $B=0$. The four conditions set forth in the logic table have now been satisfied, and it has been demonstrated that with the magnetic core devices an Exclusive-OR storage device has been provided with non-destructive read-out provisions.

Those skilled in the art will understand that various modifications may be made within the scope of the appended claims, and the number of turns of each winding or coil will be determined by conventional design requirements. They may be made of 4–79 Mo-Permalloy having some twenty laminations, with the inhibit windings 10*i*, 11*i* and reset windings 10*r* and 11*r* comprising two turns respectively, with input windings 10*a* and 11*a* having five turns, and with sampling windings 10*s* and 11*s* having three or more turns. The input set-pulses to change the stable remanence condition may be provided by a 45-volt source in series with a 10-ohm resistor. The same or a like source may be utilized for the reset windings. The sample pulses may be provided by a thyratron driver with a 700 milliampere output. These values are to be taken as suggestive of suitable values and are not to be considered as limiting. The suggested values will vary widely with different core materials, such as the ferrites, and, of course, with changes in the number of turns for each winding.

What is claimed is:

1. A storage device of the non-destructive sampling type comprising at least two magnetic cores of shape providing closed magnetic circuits each capable of assuming different stable remanence conditions, each core having an opening therein, a reset winding associated with each said opening and wound in figure eight form with the bights of the figure eight winding respectively embracing the inner and outer portions of the magnetic core in the region of said opening, energizing means for said reset windings for establishing in said cores a first stable remanence condition, input, inhibit and sampling windings embracing each of said cores, two input circuits each including an input winding of one core and an inhibit winding of the other core for selectively applying pulses thereto for changing said one core to a second stable remanence condition from a first stable remanence condition and for maintaining said other core in its first stable remanence condition, both of said cores being maintained in their first stable remanence condition when pulses are applied to both of said input circuits, output means magnetically coupled to each of said cores for developing in series-circuit relation therein an output in response to a change in flux level in said cores of predetermined magnitude, and a sampling circuit for applying sampling pulses to said sampling windings of amplitude less than that required to change said cores from one stable remanence condition to the other for generating in said output circuit an output indicative of the existence in one of said cores of said first stable remanence condition and the existence in the other of said cores of said second stable remanence condition and for producing zero output when both of said cores are in said first stable remanence condition.

2. The device of claim 1 in which each of said sampling windings is positioned to embrace its respective core thereby to produce a magnetizing force radial of said core.

3. An Exclusive-OR storage device for producing an output pulse in an output circuit when a pulse is applied to either one but not both of two input circuits, comprising at least a first and a second magnetic core each capable of assuming different stable remanence conditions, each of said cores being of shape providing closed magnetic circuits, reset, input, inhibit, output and sampling windings embracing each of said cores, each core having at least a first and a second opening therein, said reset and inhibit windings being respectively associated with said first and second openings and each having a shape corresponding with a figure eight the bights of which embrace the inner and outer portions of the magnetic core in the region of said openings, means for energizing each of said reset windings for establishing in said cores a first stable remanence condition, each of said input circuits respectively including said input winding of one core and said inhibit winding of the other core, said pulse applied to one of said input circuits changing said one core to a second stable remanence condition from a first stable remanence condition and for maintaining said other core in its first stable remanence condition, said pulse when applied to both of said input circuits maintaining both of said cores in their first stable remanence conditions, said output windings being connected in series circuit relation in said output circuit and respectively responsive to changes in flux levels in said cores for developing said output pulses, said sampling winding being positioned in additional openings in each of said cores to produce upon energization a magnetizing force effective generally radially of its respective core and non-destructive of said remanence condition, and a sampling circuit for energizing said sampling windings for generating in said output circuit with each said energization an output pulse indicative of a stable remanence condition of one core differing from the stable remanence condition of said other core.

4. An Exclusive-OR switching device comprising a first and a second magnetic core of shape providing closed magnetic circuits, each of said cores being capable of assuming a first and a second stable remanence flux state, each of said cores having at least four openings therein, reset, inhibit, output, input and sampling windings for each said core, said reset winding and said inhibit winding for each said core being respectively associated with a first and a second of said openings and each having a shape corresponding with a figure eight, the bights of each of the figure eight windings respectively embracing the inner and outer portions of the magnetic core in the region of said first and second openings, said output windings being connected in series circuit relation for developing an output in response to a change in the flux level in said cores of predetermined magnitude, means for energizing said reset windings for establishing said cores in their first stable remanence states, means connecting a first source of pulses to said input winding of said first core and to said inhibit winding of said second core for changing said first core to its second stable remanence state and for maintaining said second core in its first stable remanence state, said last-named means connecting a second source of pulses to said inhibit winding of said first core and to said input winding of said second core for changing said second core to its second stable remanence state and for maintaining said first core in its first stable remanence state, both of said cores being maintained in their first stable remanence states when pulses are applied by said first and said second sources of pulses, said sampling winding for each said core being wound through a third and a fourth of said openings, means for applying pulses to said sampling windings to produce a radial magnetizing force in each of said cores and ineffective to change the stable remanence states of said cores for producing in said output circuit an output indicative of the existence in one of said cores of said second stable remanence state and for producing a negligible output when both of said cores are in said first stable remanence states.

References Cited in the file of this patent

UNITED STATES PATENTS

| | | |
|---|---|---|
| 2,802,953 | Arsenault et al. | Aug. 13, 1957 |
| 2,810,901 | Crane | Oct. 22, 1957 |
| 2,814,794 | Bauer | Nov. 26, 1957 |
| 2,842,755 | Lamy | July 8, 1958 |
| 2,846,667 | Goodell et al. | Aug. 5, 1958 |
| 2,966,664 | Lamy | Dec. 27, 1960 |